US007123475B2

(12) United States Patent
Park

(10) Patent No.: US 7,123,475 B2
(45) Date of Patent: Oct. 17, 2006

(54) AC/DC ADAPTER AND NOTEBOOK COMPUTER USING THE SAME

(75) Inventor: Jea-woo Park, Anyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/730,090

(22) Filed: Dec. 9, 2003

(65) Prior Publication Data

US 2004/0257761 A1 Dec. 23, 2004

(30) Foreign Application Priority Data

Jun. 23, 2003 (KR) ...................... 10-2003-0040849

(51) Int. Cl.
*G06F 1/16* (2006.01)
*H01R 4/66* (2006.01)

(52) U.S. Cl. ...................................... 361/686; 439/108

(58) Field of Classification Search ................ 361/686, 361/752, 816, 818, 753; 312/223.1, 223.2; 324/771; 326/33; 174/6, 260, 78, 113 R; 307/140; 439/502, 92, 108, 623, 106, 578, 439/579

See application file for complete search history.

(56) References Cited

U.S. PATENT DOCUMENTS

| 4,025,139 | A | * | 5/1977 | Martucci | ...................... 439/106 |
| 5,518,418 | A | * | 5/1996 | Larabell | ...................... 439/505 |
| 5,836,783 | A | * | 11/1998 | Morisawa et al. | .......... 439/502 |
| 6,152,778 | A | * | 11/2000 | Dalton | ........................ 439/638 |
| 6,608,264 | B1 | * | 8/2003 | Fouladpour | .............. 200/51.03 |
| 6,634,896 | B1 | * | 10/2003 | Potega | ........................ 439/218 |
| 6,909,907 | B1 | * | 6/2005 | Oyang et al. | ............. 455/556.1 |
| 2002/0180277 | A1 | * | 12/2002 | Acharya et al. | ............ 307/140 |
| 2004/0018774 | A1 | * | 1/2004 | Long et al. | ................. 439/620 |

FOREIGN PATENT DOCUMENTS

| JP | 6-48343 | 9/2001 |
| KR | 1995-25511 | 9/1995 |
| KR | 1997-63671 | 12/1997 |
| KR | 10-252252 | 1/2000 |
| KR | 10-332964 | 4/2002 |

OTHER PUBLICATIONS

"Sega CD User Manual", p. 7.*

* cited by examiner

*Primary Examiner*—Lisa Lea-Edmonds
*Assistant Examiner*—Corey Broussard
(74) *Attorney, Agent, or Firm*—Staas & Halsey LLP

(57) ABSTRACT

An AC/DC adapter having a main body for converting AC power into DC power and a DC power cable connected to the adapter main body. A power supplying jack is provided at an end of the DC power cable and connected to a connection port of one of a plurality of electronic devices constituting an electronic system to supply DC power therethrough. At least one grounding cable branches off from the DC power cable and forms a grounding path. A grounding jack is provided at an end of the grounding cable and is connected to a connection port of another electronic device of the plurality of the electronic devices to connect the grounding cable and a grounding area of the another electronic device of the plurality of the electronic devices.

10 Claims, 4 Drawing Sheets

FIG. 1A
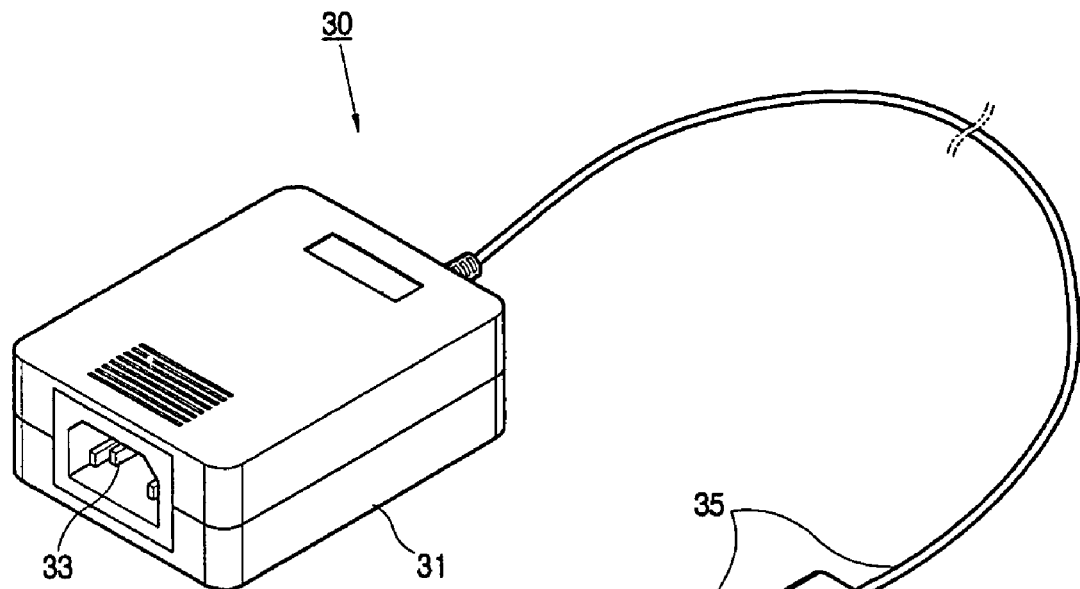
FIG. 1B
FIG. 1C
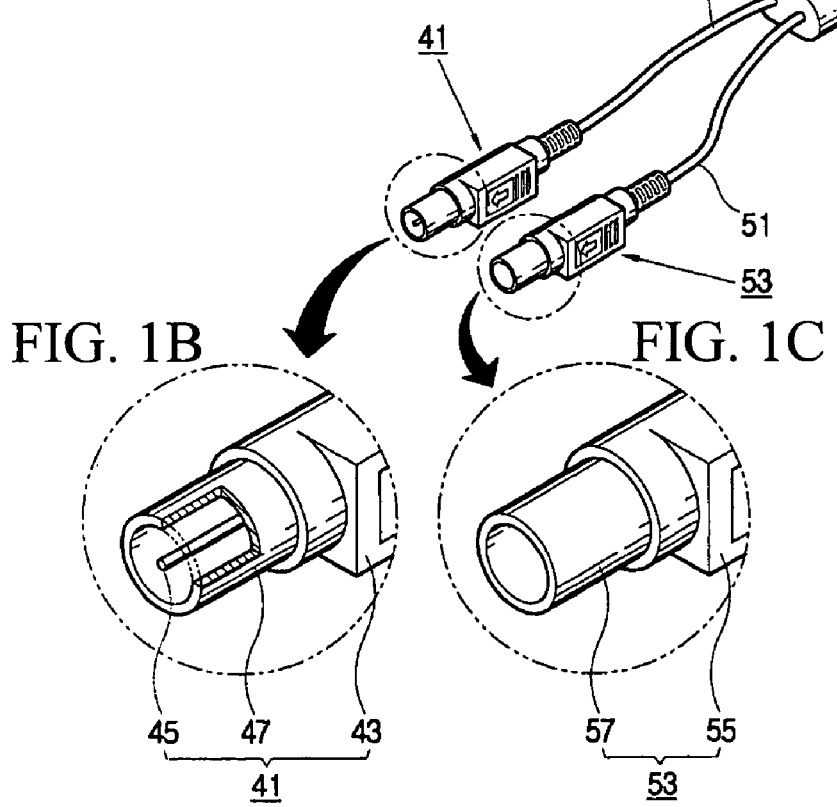

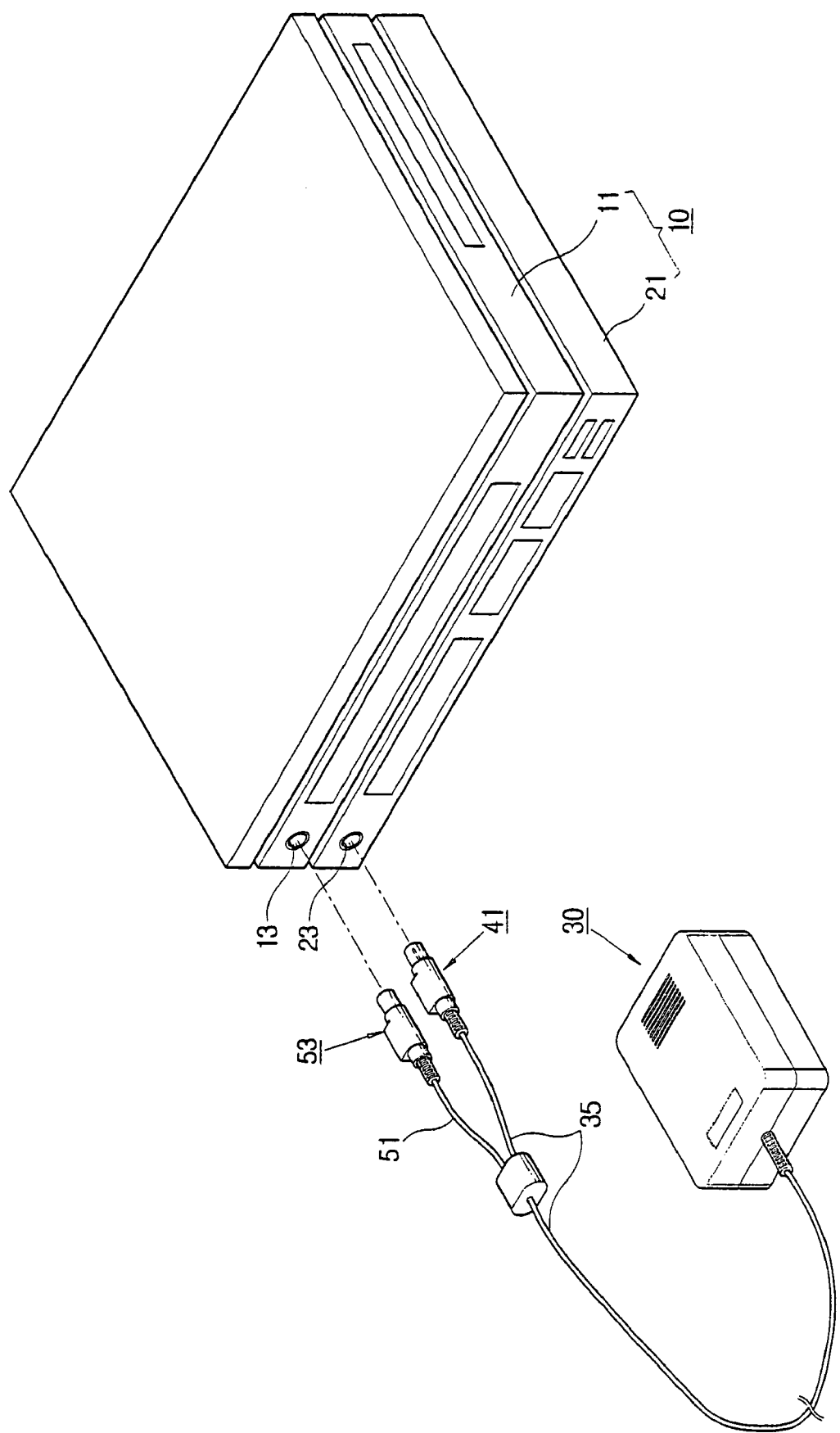

AC/DC ADAPTER AND NOTEBOOK COMPUTER USING THE SAME

CROSS-REFERENCE TO RELATED APPLICATION

This application claims the benefit of Korean Patent Application No. 2003-040849, filed Jun. 23, 2003, in the Korean Intellectual Property Office, the disclosure of which is incorporated herein by reference.

BACKGROUND OF THE INVENTION

1. Field of the Invention

The present invention relates to an AC/DC adapter and a notebook computer using the same, and more particularly to an AC/DC adapter having an additional grounding jack and a notebook computer using the same.

2. Description of the Related Art

An AC/DC adapter is generally used to convert AC power into DC power and supply DC power to various electronic devices such as a notebook computer. As shown in FIG. 4, a conventional notebook computer 110 has a computer main body 111 mounted with a central processing unit (CPU) (not shown). A docking station 121 is detachably connected with the computer main body 111 to expand a computer system and cooperate with the computer main body 111. A connection port 113 and 123 is selectively connected to a power supply jack (not shown) of an AC/DC adapter 130 to supply DC power through a power cord 135 from the AC/DC adapter 130. Additionally, the computer main body 111 and the docking station 121 are electrically connected by a connector 127. The connector 127 receives/sends data between the computer main body 111 and the docking station 121.

Thus, to use a notebook computer 110, a user may connect the power supply jack of the AC/DC adapter 130 to either of the connection ports 113 and 123 of the computer main body 111 or the docking station 121.

In a notebook computer system 110 in which the computer main body 111 and the docking station 121 each constitute an independent system, it is very important that the potential difference between the computer main body 111 and the docking station 121 is removed to reduce EMI(electromagnetic interference).

Here, if the AC/DC adapter 130 is connected only to the connection port 123 of the docking station 121 and not to the grounding area 115 of the computer main body 111, the ESD (electrostatic discharge) current generated from the computer main body 111 is discharged to the earth 129 through the grounding area 115 of the computer main body 111, the connector 127, the grounding area 125 of the docking station 121, and the AC/DC adapter 130.

In the conventional notebook computer, each grounding area of the computer main body 111 and the docking station 121 is connected, but only by the connector 127, so that the grounding connection is not adequate with regard to EMC (electromagnetic compatability). That is, the grounding connection between the computer main body 111 and the docking station 121 through the connector 127 is not sufficient to remove the electromagnetic interference. Further, in the conventional notebook computer, the ESD current generated from the computer main body 111 is discharged to the earth 129 through the long grounding path formed through the connector 127, the docking station 121 and the AC/DC adapter 130, thereby causing damage to each of the circuit systems of the computer main body 111 and the docking station 121.

SUMMARY OF THE INVENTION

Accordingly, it is an aspect of the present invention to provide an AC/DC adapter having an additional grounding jack and a notebook computer using the same.

Additional aspects and advantages of the invention will be set forth in part in the description which follows and, in part, will be obvious from the description, or may be learned by practice of the invention.

The foregoing and/or other aspects of the present invention are achieved by providing an AC/DC adapter comprising: an adapter main body converting AC power into DC power; a DC power cable connected to the adapter main body; a power supplying jack provided at an end of the DC power cable and connected to a connection port of one of a plurality of electronic devices constituting an electronic system to supply DC power therethrough; at least one grounding cable branched off from the DC power cable and forming a grounding path; and a grounding jack provided at an end of the grounding cable and connected to a connection port of another electronic device of the plurality of the electronic devices to connect the grounding cable and a grounding area of the another electronic device of the plurality of the electronic devices.

According to an aspect of the invention, the power supplying jack includes a power supplying terminal to supply DC power supplied through the DC power cable to one of the plurality of the electronic devices; and a tubular first grounding terminal disposed concentrically with and apart from the power supplying terminal, and the grounding jack comprises a second grounding terminal having the same cross section and same size as those of the first grounding jack.

The foregoing and/or other aspects of the present invention are achieved by providing a notebook computer having a computer main body having a first connection port to which electric power is supplied from the outside; a docking station having a second connection port to which electric power is supplied from outside the docking station, wherein the docking station and the computer main body are electrically connected through a connector, and an AC/DC adapter connected to one of either the first connection port of the computer main body or the second connection port of the docking station to supply DC power therethrough, the AC/DC adapter having an adapter main body converting AC power into DC power; a DC power cable connected to the adapter main body; and a power supplying jack provided at an end of the DC power cable and connected to one of either the first connection port of the computer main body or the second connection port of the docking station to supply DC power therethrough; a grounding cable branched off from the DC power cable and forming a grounding path; and a grounding jack provided at an end of the grounding cable and connected to the other one of the first connection port of the computer main body or the second connection port of the docking station to connect the grounding cable and one of the grounding areas of the computer main body and the docking station to each other.

According to an aspect of the invention, the power supplying jack comprises: a power supplying terminal to supply DC power supplied through the DC power cable to an electronic device; and a first grounding terminal disposed concentrically with and apart from the power supplying terminal, and the grounding jack comprises a second grounding terminal having the same section and same size as those of the first grounding jack.

BRIEF DESCRIPTION OF THE DRAWINGS

The above and other aspects and/or advantages of the present invention will become apparent and more readily appreciated from the following description of the embodiments, taken in conjunction with the accompanying drawings of which:

FIGS. 1A through 1C are enlarged perspective views showing a power supplying jack and a grounding jack of an AC/DC adapter according to an embodiment of the present invention;

FIG. 2 is a combined perspective view of an AC/DC adapter and a notebook computer according to an embodiment of the present invention;

DETAILED DESCRIPTION OF THE EMBODIMENTS

Figure 3:
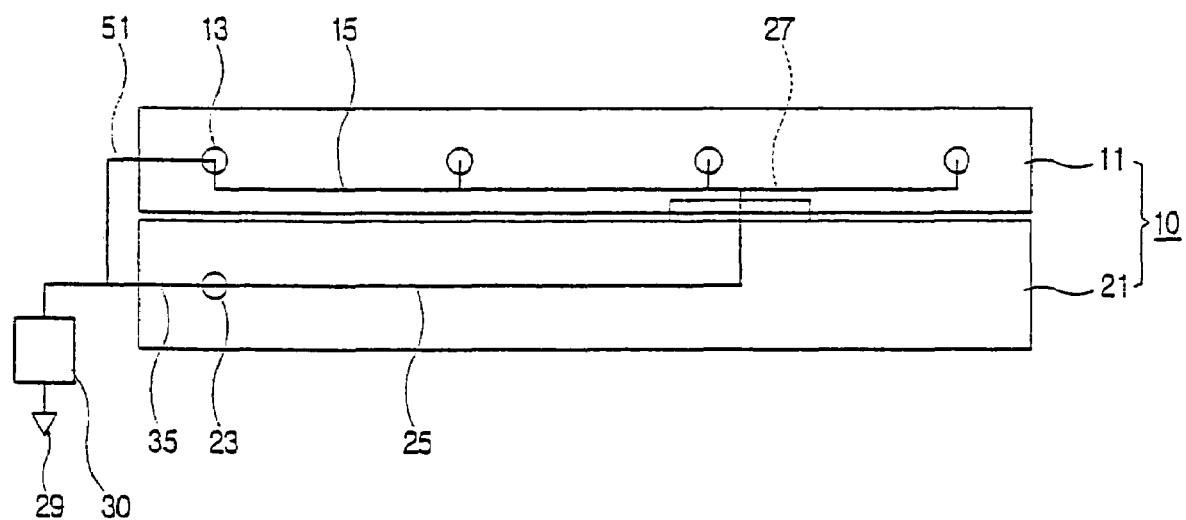
FIG. 3 schematically shows a grounding connection of FIG. 2.
Figure 4:
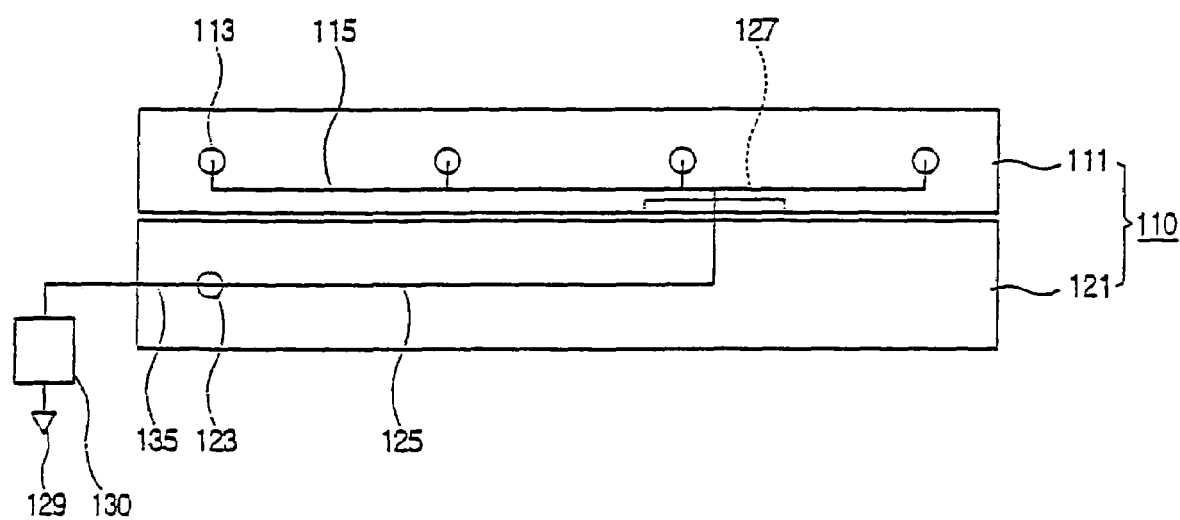
FIG. 4 schematically shows a grounding connection of a conventional AC/DC adapter and a notebook computer.

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in the example of FIG. 2, a notebook computer 10 has a computer main body 11 mounted with a central processing unit (CPU) (not shown) and a docking station 21 detachably connected to the computer main body 11 to expand a computer system. The computer main body 11 and the docking station 21 are provided with a first connection port 13 and a second connection port 23 to receive electric power supplied from the outside, respectively. As illustrated in FIG. 3, the computer main body 11 and the docking station 21 are electrically connected by a connector 27, and the connector 27 receives/sends data and power between the computer main body 11 and the docking station 21. While not shown, the docking station 21 is connectable to input devices (such as keyboards and mice), printers, scanners, display devices, and other peripherals that are customarily associated with desktop computers.

FIGS. 1A–1C are enlarged perspective views showing a power supplying jack 41 and a grounding jack 53 of an AC/DC adapter 30 according to an embodiment of the present invention. As shown in this drawing, an adapter 30 according to an embodiment of the present invention possesses an adapter main body 31 converting AC power into DC power.

The adapter main body 31 is provided with a plug 33 to supply AC power from an outside source to the adapter main body 31. The adapter main body 31 also is connected to a DC power cable 35 to supply DC power converted by the adapter main body 31 to electric devices.

At an end of the DC power cable 35 a power supplying jack 41 is provided for connecting to one of the connection ports 13 and 23 of the computer main body 11 or of the docking station 21 to supply DC power.

In the shown embodiment, the power supplying jack 41 has a first grip part 43 made of insulating material and a power supplying terminal 45 made of conductive material that protrudes from an end of the first grip part 43 to supply DC power supplied through the DC power cable 35 to either the computer main body 11 or the docking station 21. A tubular first grounding terminal 47 is disposed concentric with and apart from the power supplying terminal 45 and is made of conductive material. The power supplying jack 41 supplies power to one of either the computer main body 11 or the docking station 21 and grounds by being connected to the respective grounding areas 15 and 25 (refer to FIG. 3) of the computer main body 11 and the docking station 21.

The AC/DC adapter according to an embodiment of the present invention includes a separate grounding cable 51 that branches off from a side of the DC power cable 35 and forms a grounding path. At an end of the grounding cable 51 a grounding jack 53 is provided for connecting to the remaining one of the connection ports 13 and 23 of the computer main body 11 or of the docking station 21. Plugging in the grounding jack 53 connects the grounding cable 51 to either grounding area 15 or 25 of the other one of the computer main body 11 and the docking station 21.

In the shown embodiment, the grounding jack 53 has a second grip part 55 made of insulating material that is configured to be held and a tubular second grounding terminal 57 protruding from an end of the second grip part 55. The second grounding terminal 57 is made of conductive material. As shown, the grounding jack 53 does not include a power supply terminal 45 as does the power supply jack 41. The second grounding terminal 57 has the same cross section and is the same size as the tubular first grounding terminal 47 of the power supplying jack 41. Thus, the power supplying jack 41 and the grounding jack 53 can be compatibly connected to each of the connection ports 13 and 23 of the computer main body 11 and the docking station 21. However, it is understood that the cross sections do not need to be the same in all aspects of the present invention and that other types of grounding jacks could be used.

With this configuration, as shown in FIG. 2, the power supplying jack 41 of the AC/DC adapter 30 according to an embodiment of the present invention is connected to the second connection port 23 of the docking station 21 and the grounding jack 53 of the AC/DC adapter 30 is connected to the first connection port 13 of the computer main body 11 and then AC power is supplied from an outside source (not shown) to the AC/DC adapter 30.

If AC power is supplied to the AC/DC adapter 30, the AC/DC adapter 30 converts AC power into DC power and converted DC power is supplied to the power supplying jack 41 through the DC power cable 35. The circuitry for converting AC power into DC power is generally well known and will not be discussed.

The DC power supplied to the docking station 21 is supplied to the computer main body 11 through the connector 27. Thus, the computer main body 11 and the docking station 21 are electrically connected. However, where the docking station 21 is not used, the power supplying jack 41 is connected to the first connection port 13 to supply power and a ground to the computer 11.

As shown in FIG. 3, the grounding paths of the computer main body 11, the docking station 21 and the AC/DC adapter 30 comprise a first grounding path through the connector 27 and a second grounding path through the grounding cable 51.

Therefore, as the computer main body 11 and the docking station 21 are operated, part of the ESD (electrostatic discharge) current generated from the computer main body 11 and the docking station 21 is discharged to the ground 29 through the connector 27, the grounding area 25 of the docking station 21, and the grounding conductor of the DC power cable 35 and the AC/DC adapter 30. Furthermore, a part of the ESD current generated from the computer main body 11 is discharged to the ground 30 through the grounding cable 51 and the AC/DC adapter 30, so that the damage of each of the circuit systems of the computer main body 11 and the docking station 21 due to the ESD current can be reduced.

Moreover, because the grounding cable 51 connects the grounding area 15 of the computer main body 11 and adapter 30 (i.e., the grounding path between the computer main body 11 and the docking station 21) is provided in a plurality of paths, the potential difference between the computer main body 11 and the docking station 21 is minimized, thereby reducing EMI (electromagnetic interference).

Likewise, if an additional grounding jack is provided at the AC/DC adapter that supplies electric power to a plurality of electronic devices constituting an electronic system, the potential difference between the electronic devices constituting an electronic system can be minimized. Therefore, EMI of each of the electronic devices and damage to the circuit systems of each of the electronic devices due to the ESD can be reduced.

In the above-described embodiment, the power supplying jack of the AC/DC adapter is connected to the second connection port of the docking station and the grounding jack of the AC/DC adapter is connected to the first connection port of the computer main body. However, the power supplying jack of the AC/DC adapter may be connected to the first connection port of the computer main body and the grounding jack of the AC/DC adapter may be connected to the second connection port of the docking station. However it is understood that the present invention could be useful when used with other devices that need second grounding conductors to minimize potential difference and potential ESD damage such as personal digital assistants, digital cameras, digital music players and other such electronic devices that rely in part on docking stations for expanded capabilities and/or recharging.

As described above, the present invention provides the AC/DC adapter in which the potential difference between the electronic devices constituting an electronic system can be minimized. Thus, EMI of each of the electronic devices, such as the notebook computer and docking station in the examples above, and the damage to the circuit systems of each of the electronic devices due to the ESD can be reduced.

Although a few embodiments of the present invention have been shown and described, it will be appreciated by those skilled in the art that changes may be made in these embodiments without departing from the principles and spirit of the invention, the scope of which is defined in the appended claims and equivalents thereof.

What is claimed is:

1. A notebook computer comprising:
    a computer main body having a first connection port to which electric power is supplied from outside the computer main body;
    a docking station having a second connection port to which electric power is supplied from outside the docking station, wherein the docking station and the computer main body are electrically connected through a connector; and
    an AC/DC adapter connected to one of the first connection port of the computer main body and the second connection port of the docking station to supply DC power, the AC/DC adapter comprising:
        an adapter main body converting AC power into DC power;
        a DC power cable connected to the adapter main body;
        a power supplying jack provided at an end of the DC power cable and connected to one of the first connection port of the computer main body and the second connection port of the docking station to supply DC power therethrough;
        a grounding cable branched off from the DC power cable and forming a grounding path; and
        a grounding jack provided at an end of the grounding cable and connected to the other one of the first connection port of the computer main body and the second connection port of the docking station to connect the grounding cable and one of grounding areas of the computer main body and the docking station to each other,
        wherein the connector receives and sends data and DC power between the docking station and the computer main body, and
        wherein the grounding jack has a grounding conductor and no power supply terminal.

2. The notebook computer according to claim 1, wherein:
    the power supplying jack comprises: a power supplying terminal to supply DC power supplied through the DC power cable to an electronic device; and a first grounding terminal disposed concentrically with and apart from the power supplying terminal, and
    the grounding jack comprises a second grounding terminal having the same cross section and same size as those of the first grounding terminal.

3. An AC/DC power supply adapter for a portable device and a docking station that interfaces with the portable device, the adapter comprising:
    a base adapted to convert an AC power input into DC power;
    a power cable connected to the base and terminating at another end in a power supplying jack; and
    a grounding cable connected to the power cable and terminating at another end in a grounding jack,
    wherein the power supplying jack is connectable to one of the portable device and the docking station, and the grounding jack is connectable to the other one of the portable device and docking station to supply a ground path other than through the power supplying jack,
    wherein the docking station and the portable device are electrically connected through a connector,
    wherein the connector receives and sends data and DC power between the docking station and the portable device, and
    wherein the grounding jack has a grounding conductor and no power supply terminal.

4. The AC/DC power supply adapter as in claim 3, wherein the power supplying jack includes a terminal for supplying DC power and a tubular grounding conductor coaxial with the terminal.

5. The AC/DC power supply adapter as in claim 4, wherein the grounding jack includes a tubular grounding conductor.

6. The AC/DC power supply adapter as in claim 5, wherein the power supplying jack and the grounding jack have the same dimensions.

7. An AC/DC power supply adapter for connecting to first and second electrical devices comprising:
    a base unit adapted to convert AC power into DC power;

a power cable extending from the base unit and terminating in a power supplying jack so as to provide a power supply path and a first ground path; and a grounding cable splitting off from the power cable and terminating in a grounding jack so as to supply a second ground path other than the first ground path, wherein the power supplying jack is for connecting to the first electrical device and the grounding jack is for connecting to the second electrical device, wherein the first and second electrical devices are electrically connected through a connector, wherein the connector receives and sends data and DC power between the first and second electrical devices, and wherein the grounding jack has a grounding conductor and no power supply terminal.

8. The AC/DC power supply adapter as in claim 7, wherein the power supplying jack includes a terminal for supplying DC power and a tubular grounding conductor coaxial with the terminal.

9. The AC/DC power supply adapter as in claim 8, wherein the grounding jack includes a tubular grounding conductor.

10. The AC/DC power supply adapter as in claim 9, wherein the power supplying jack and the grounding jack have the same dimensions.

* * * * *